May 21, 1935.    H. A. FLOGAUS    2,001,870
MOTOR VEHICLE DRIVING MECHANISM
Filed June 21, 1934    2 Sheets-Sheet 1

Inventor
Howard A. Flogaus

By Blackmore, Spencer & Flink
Attorneys

May 21, 1935. H. A. FLOGAUS 2,001,870
MOTOR VEHICLE DRIVING MECHANISM
Filed June 21, 1934 2 Sheets-Sheet 2

Inventor
Howard A. Flogaus
Attorneys

Patented May 21, 1935

2,001,870

UNITED STATES PATENT OFFICE 2,001,870

MOTOR VEHICLE DRIVING MECHANISM

Howard A. Flogaus, Ferndale, Mich., assignor to General Motors Truck Corporation, Pontiac, Mich., a corporation of Delaware Application June 21, 1934, Serial No. 731,668

7 Claims. (Cl. 180—70)

One of the objects of the present invention is to provide a motor vehicle in which all the space within the length and width of the vehicle is available for carrying load. Proposals heretofore have been made for positioning a power plant transversely of a passenger coach beneath the rear seat and beyond a centrally disposed differential between the driving wheels. In the case of the larger vehicles it is found that for sufficient power output to give satisfactory operation there must be used an engine, clutch and transmission which when assembled in succession according to conventional practices has an over-all length too great to fit within the maximum permissible vehicle width.

To meet the situation it is here proposed to place the variable speed mechanism in longitudinal alinement with the centrally disposed differential and beneath the floor line with the engine and clutch housed under the rear cross seat in transverse alinement and in spaced relation on opposite sides of the longitudinal plane containing the differential and change speed gearing, there being within the intermediate space a pair of nested shafts for connecting, respectively, the engine power shaft with the driving element of the clutch and the clutch driven element with the drive shaft of the transmission gear box.

Figure 1:
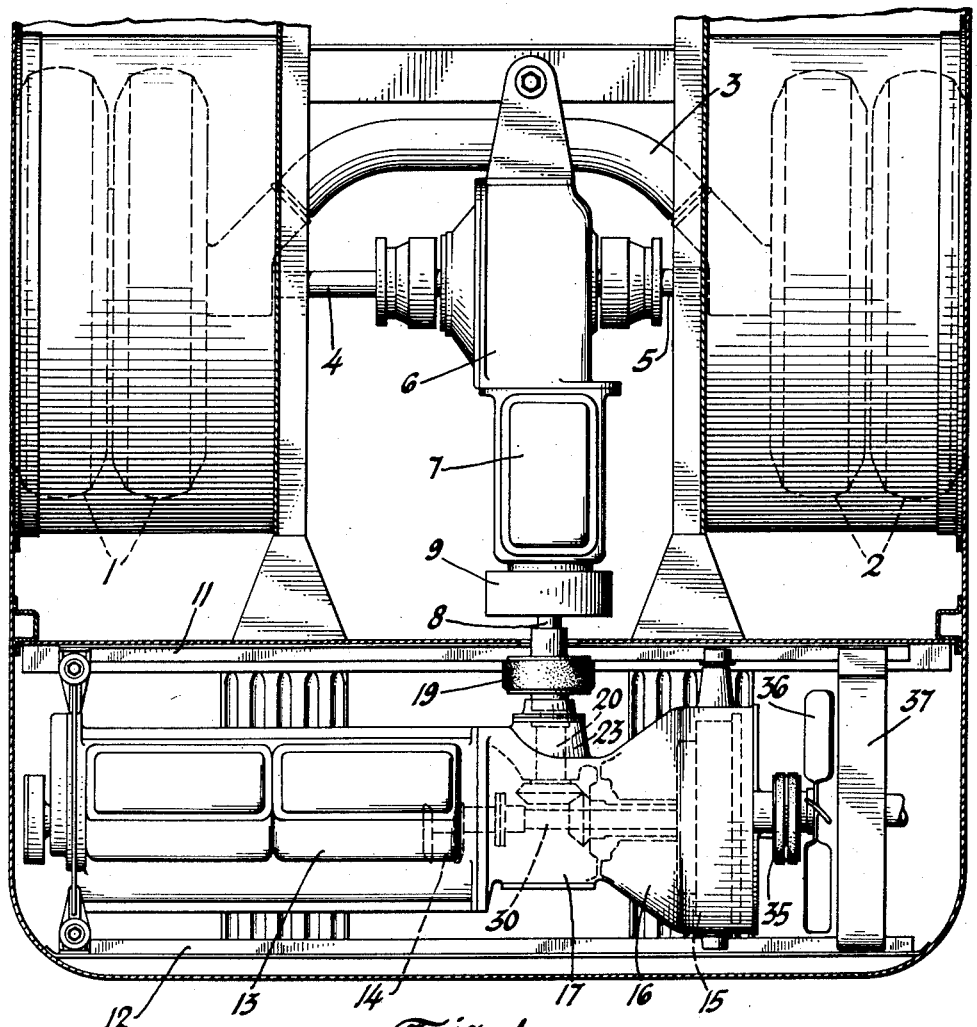
Figure 2:
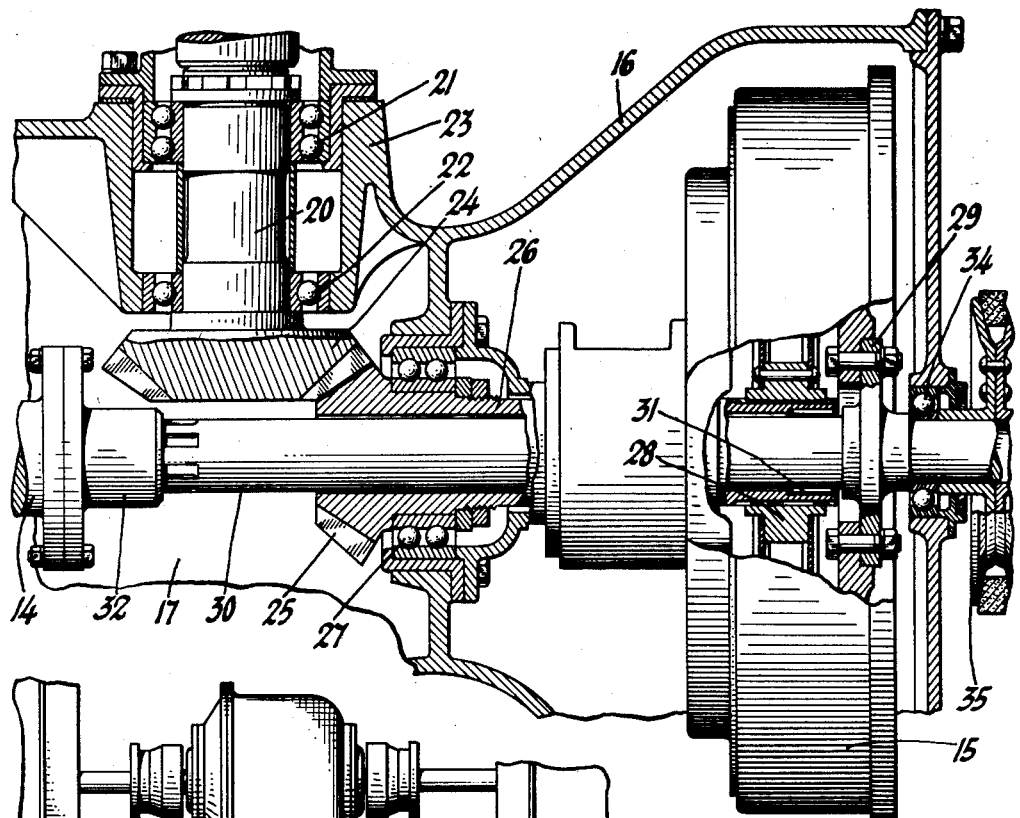
Figure 3:
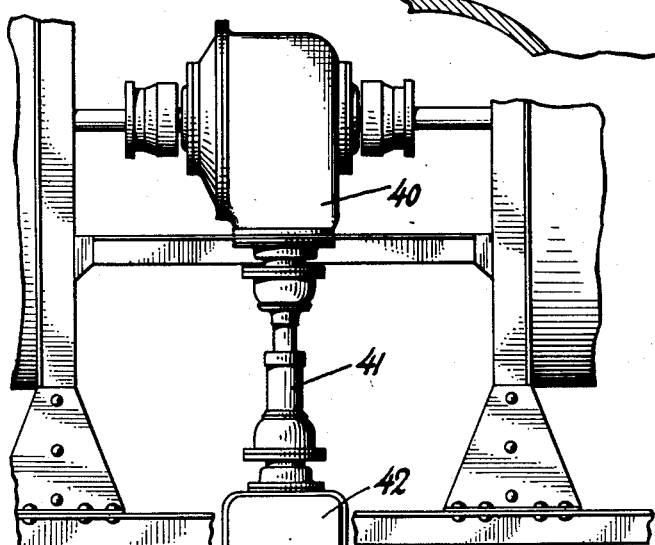

A better understanding of the improved vehicle propelling mechanism will be had upon reference to the accompanying drawings, wherein Figure 1 is a top plan view of the back portion of a vehicle illustrating the compact grouping of parts in a preferred embodiment; Figure 2 is an enlarged sectional view showing the power transmission line according to the layout of Figure 1 at the clutch and the geared connection of the transverse clutch driven shaft with a longitudinal transmission drive shaft located between the engine and clutch, and Figure 3 is a fragmentary top plan view partly in section of a modification.

The vehicle shown in the drawings is of the unitary body and chassis frame type, supported through suitable springs upon front and rear road wheels with the operator located in the forward end of the vehicle and controlling the rearwardly disposed power plant by a system of long links and levers either alone or in combination with electrical appliances or fluid pressure devices. Transversely spaced dual driving wheels are indicated at 1 and 2 mounted upon a forwardly arched dead axle 3 and driven by axle shafts 4 and 5, which are connected by universal joints with suitable differential mechanism located within a centrally disposed housing 6. The differential housing is mounted upon the body framework in any convenient manner and rigidly supports as a unit therewith a housing 7 for variable speed mechanism with which is associated a propeller shaft 8. If desired, an emergency brake, as indicated at 9, may be associated with the transmission drive or propeller shaft 8.

Mounted at the rear of the body framing are a pair of roller tracks 11 and 12 which removably support therebetween an engine power plant comprising an internal combustion engine 13 of the cylinder-in-line type, the crank shaft of which is indicated by dotted lines at 14, and a clutch and flywheel assembly 15 enclosed within a housing 16 integral with an intermediate gear box 17 rigidly secured to the engine crank case. As seen in the drawings, the transversely alined engine and clutch mechanism are located upon opposite sides of the gear box 17, which in turn is in longitudinal alinement with the propeller shaft 8.

The propeller shaft 8 is joined through a resilient coupling 19 with a short shaft section 20 mounted upon anti-friction bearings 21 and 22 in the lateral extension 23 of the intermediate housing 17 and the shaft 20 carries at its inner end a bevelled gear 24. Meshing with the bevelled gear 24 is a driving pinion 25 on a hollow shaft 26 having a bearing 27 in a transverse wall of the housing and carrying at its opposite end the hub 28 of a pair of driven clutch discs associated with the engine flywheel 15. The flywheel in turn is bolted to an annular flange 29 of a driving shaft 30 extending through and nested within the hollow driven shaft 26 between which there is a roller bearing 31 adjacent the flywheel. One end of the shaft 30 has a splined driving connection through the coupling 32 secured to the engine power shaft 14, while the opposite end of the shaft is mounted upon an anti-friction bearing element 34 in the end wall of the clutch casing and extends beyond the casing where it carries a pulley 35 for driving various accessory devices through belts or the like, as for example, the fan 36 which induces a draft of air through the radiator 37 forming a part of the engine cooling system.

It will be obvious that when the clutch is engaged the power output from the engine is transmitted from the engine crank shaft through the nested shafts associated with the driving and driven clutch elements and through the bevelled gearing to the longitudinally disposed propeller shaft for driving the wheels through the differential mechanism and transmission gearing. With the construction and arrangement of parts described it will be apparent that an unusually long engine can be readily accommodated transversely of the vehicle, since all the space to one side of the propeller shaft may be utilized for the engine and the space on the opposite side occupied by the engine flywheel, the clutch, the engine cooling radiator, and other accessory devices.

In the alternative construction shown in Figure 3, the differential mechanism within the housing 40 is driven by a universally jointed and splined sectioned drive shaft 41 from the change speed mechanism contained within the housing 42 which is mounted directly upon and forms a part of the power plant unit. In this case the input shaft of the variable speed gearing projects into the intermediate housing 43 between the transversely spaced engine 44 and flywheel housing 45 and carries a bevelled gear 46. The gear 46 meshes with a bevelled gear 47 keyed on the clutch driven shaft 48 enclosing the clutch driving shaft 49 and being mounted in bearings 50 at opposite ends of the intermediate housing 43.

I claim:

1. Vehicle driving mechanism, including differential and change speed gearing arranged in longitudinal succession between the road wheels, a transversely disposed power plant located principally to one side of the vehicle center line, a flywheel on the opposite side of the vehicle center line, a power shaft connecting the power plant and flywheel and having accessory drive means beyond the flywheel, a driven sleeve surrounding said shaft and having clutch mechanism at one end for engagement with said flywheel and a driving pinion at its other end, and a driven gear meshing with said pinion and having drive connection with the input side of the change speed gearing.

2. A motor vehicle having a pair of road wheels, differential drive mechanism between said wheels, a power plant for driving said differential comprising an engine having a power shaft, a combined flywheel and clutch mechanism in spaced relation to the engine, clutch driving and driven shafts located between the flywheel and engine with the driving shaft connected with the engine power shaft, change speed gearing angularly arranged with respect to the engine power shaft in alinement with the space between the engine and clutch, means transmitting the drive from said driven shaft to the change speed gearing and power transmitting means between the change speed gearing and said differential mechanism.

3. In a motor vehicle having a pair of driving wheels, means for driving said wheels including differential mechanism and variable speed gearing arranged in longitudinal succession and supported in casings rigidly joined together, an engine having its power shaft disposed transversely of the vehicle, clutch mechanism spaced transversely from the engine, a drive connection between the engine and clutch mechanism and clutch driven means located between the clutch mechanism and the engine and drive connected with the variable speed gearing.

4. A power plant for motor vehicles, including as a unitary assembly, an engine, a gear box and clutch mechanism arranged in succession and variable speed power transmitting mechanism mounted in a lateral extension of the gear box.

5. An assembly of motor vehicle propelling mechanisms, including a centrally disposed gear box having a power transmission shaft, clutch mechanism joined to the gear box to one side thereof and angularly related to said shaft, an engine joined to the gear box on the other side thereof, in axial alinement with said clutch, a pair of nested shafts mounted in the gear box and respectively connecting the engine power shaft with the driving clutch element and the driven clutch element with the power transmission shaft and change speed mechanism disposed transversely of the engine and clutch in alinement with said gear box for drive connection with the power transmission shaft.

6. Motor vehicle driving mechanism, including a power transmitting shaft disposed longitudinally of the vehicle, change speed mechanism associated with said shaft, differential drive mechanism drive connected with the longitudinally disposed change speed mechanism, an engine and clutch assembly spaced longitudinally of the change speed mechanism and disposed transversely thereto, with the clutch and engine arranged in spaced relation on opposite sides of the axis of said shaft, and clutch driven means located between the engine and clutch and drive connected with the power transmitting shaft.

7. Motor vehicle driving mechanism including longitudinally disposed change speed mechanism, a transversely disposed engine located to one side of the longitudinal axis of said change speed mechanism, an engine driven clutch in transverse alinement with but spaced from the engine on the other side of said longitudinal axis, and clutch driven means in the space between the engine and the clutch in power transmitting relation with said longitudinally disposed change speed mechanism.

HOWARD A. FLOGAUS.